US010932496B2

(12) United States Patent
Tucker et al.

(10) Patent No.: US 10,932,496 B2
(45) Date of Patent: Mar. 2, 2021

(54) ELECTRONIC VAPING DEVICE WITH OUTLET-END ILLUMINATION (71) Applicant: Altria Client Services LLC, Richmond, VA (US)

(72) Inventors: Christopher S. Tucker, Midlothian, VA (US); Phillip Diana, Richmond, VA (US); Nam Tran, Richmond, VA (US); Matthew Caparrelli, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 15/931,999

(22) Filed: May 14, 2020

(65) Prior Publication Data
US 2020/0268050 A1 Aug. 27, 2020

Related U.S. Application Data (63) Continuation of application No. 15/858,425, filed on Dec. 29, 2017, now Pat. No. 10,687,557.

(51) Int. Cl.
*A24F 11/00* (2006.01)
*A24F 47/00* (2020.01)
(Continued)

(52) U.S. Cl.
CPC ............ *A24F 47/008* (2013.01); *A24F 40/42* (2020.01); *A24F 47/00* (2013.01);
(Continued)

(58) Field of Classification Search
CPC ...... A24F 47/008; A24F 47/002; A24F 40/00; A24F 40/42; A24F 40/95; F21V 33/0004; H05B 37/0227; H05B 3/46
(Continued)

(56) References Cited

U.S. PATENT DOCUMENTS 4,083,372 A 4/1978 Boden
5,034,721 A 7/1991 Benedictus
(Continued)

FOREIGN PATENT DOCUMENTS

CN 203446525 U 2/2014
CN 203538371 U 4/2014
(Continued)

OTHER PUBLICATIONS

Innokin Recommends New Electronic Cigarette to Smokers, last updated May 18, 2017.
(Continued)

*Primary Examiner* — Hae Moon Hyeon
(74) *Attorney, Agent, or Firm* — Harness, Dickey & Pierce, P.L.C.

(57) ABSTRACT

A cartridge for an e-vaping device includes a housing extending along a longitudinal axis of the cartridge, and an outlet-end insert coupled to the outlet end of the housing. The housing at least partially encloses a pre-vapor formulation reservoir and a vapor generator of the cartridge and further channels light via internal reflection through an interior of the housing. The outlet-end insert includes an outlet in flow communication with the vapor generator, directs the vapor generated by the vapor generator out of the cartridge through the outlet, and further emits the light channeled through the interior of the housing. One or more properties of the light are controllable.

13 Claims, 3 Drawing Sheets (51) Int. Cl.
  *A24F 40/42* (2020.01)
  *F21V 33/00* (2006.01)
  *H05B 3/46* (2006.01)
  *H05B 45/00* (2020.01)
  *H05B 47/16* (2020.01)
  *H05B 47/105* (2020.01)

(52) U.S. Cl.
  CPC ............ *F21V 33/0004* (2013.01); *H05B 3/46* (2013.01); *H05B 45/00* (2020.01); *H05B 47/105* (2020.01); *H05B 47/16* (2020.01)

(58) Field of Classification Search
  USPC .................................................. 131/328, 329
  See application file for complete search history.

(56) References Cited

U.S. PATENT DOCUMENTS

| | | | |
|---|---|---|---|
| 5,665,262 A | 9/1997 | Hajaligol et al. | |
| 5,750,964 A | 5/1998 | Counts et al. | |
| 6,603,924 B2 | 8/2003 | Brown et al. | |
| 8,191,555 B2 | 6/2012 | Herbrich et al. | |
| 8,375,957 B2 | 2/2013 | Hon | |
| 8,393,331 B2 | 3/2013 | Hon | |
| D688,415 S | 8/2013 | Kim | |
| 8,499,766 B1 | 8/2013 | Newton | |
| 8,528,569 B1 | 9/2013 | Newton | |
| D693,053 S | 11/2013 | Chen | |
| D695,450 S | 12/2013 | Benassayag et al. | |
| 8,746,240 B2 | 6/2014 | Terry et al. | |
| 8,757,147 B2 | 6/2014 | Terry et al. | |
| 8,794,231 B2 | 8/2014 | Thorens et al. | |
| 8,833,364 B2 | 9/2014 | Buchberger | |
| 8,851,068 B2 | 10/2014 | Cohen et al. | |
| D720,095 S | 12/2014 | Alima | |
| D720,496 S | 12/2014 | Alima | |
| D720,881 S | 1/2015 | Liu | |
| D724,782 S | 3/2015 | Wu | |
| D728,155 S | 4/2015 | Liu | |
| D728,156 S | 4/2015 | Wu | |
| D729,441 S | 5/2015 | Hua | |
| 9,055,617 B2 | 6/2015 | Thorens et al. | |
| 9,072,321 B2 | 7/2015 | Liu | |
| 9,095,175 B2 | 8/2015 | Terry et al. | |
| 9,101,729 B2 | 8/2015 | Liu | |
| 9,210,738 B2 | 12/2015 | Ward et al. | |
| 9,210,739 B2 | 12/2015 | Chabach et al. | |
| D748,852 S | 2/2016 | Wu | |
| D749,260 S | 2/2016 | Wu | |
| D751,249 S | 3/2016 | Chen | |
| 9,271,525 B2 | 3/2016 | Liu | |
| 9,282,772 B2 | 3/2016 | Tucker et al. | |
| 9,289,014 B2 | 3/2016 | Tucker et al. | |
| D758,649 S | 6/2016 | Liu | |
| D764,703 S | 8/2016 | Liu | |
| D765,307 S | 8/2016 | Liu | |
| 9,420,829 B2 | 8/2016 | Thorens et al. | |
| 9,427,711 B2 | 8/2016 | Terry et al. | |
| D765,907 S | 9/2016 | Liu | |
| 9,439,455 B2 | 9/2016 | Alarcon et al. | |
| D774,247 S | 12/2016 | Chen | |
| 9,510,623 B2 | 12/2016 | Tucker et al. | |
| D778,492 S | 2/2017 | Liu | |
| D778,493 S | 2/2017 | Scott | |
| D780,372 S | 2/2017 | Liu | |
| D784,610 S | 4/2017 | Bosch | |
| D785,859 S | 5/2017 | Pang | |
| 9,949,510 B2 | 4/2018 | Liu | |
| D827,195 S | 8/2018 | Chen | |
| D833,064 S | 11/2018 | Verleur et al. | |
| D834,246 S | 11/2018 | Qiu | |
| D835,337 S | 12/2018 | Beer et al. | |
| D835,574 S | 12/2018 | Trongone | |
| 10,687,557 B2 * | 6/2020 | Tucker .................. | A24F 47/008 |
| 2006/0231641 A1 | 10/2006 | Uchiyama et al. | |
| 2013/0192623 A1 | 8/2013 | Tucker et al. | |
| 2013/0255675 A1 | 10/2013 | Liu | |
| 2013/0306064 A1 | 11/2013 | Thorens et al. | |
| 2013/0306065 A1 | 11/2013 | Thorens et al. | |
| 2014/0048086 A1 | 2/2014 | Zhanghua | |
| 2014/0053856 A1 | 2/2014 | Liu | |
| 2014/0261487 A1 | 9/2014 | Chapman et al. | |
| 2014/0270729 A1 | 9/2014 | DePiano et al. | |
| 2014/0283855 A1 | 9/2014 | Hawes et al. | |
| 2014/0345635 A1 | 11/2014 | Rabinowitz et al. | |
| 2015/0020823 A1 | 1/2015 | Lipowicz et al. | |
| 2015/0027470 A1 | 1/2015 | Kane et al. | |
| 2015/0083147 A1 | 3/2015 | Schiff et al. | |
| 2015/0101625 A1 | 4/2015 | Newton et al. | |
| 2015/0128973 A1 | 5/2015 | Li et al. | |
| 2015/0144145 A1 | 5/2015 | Chang et al. | |
| 2015/0181930 A1 | 7/2015 | Liu | |
| 2015/0181944 A1 | 7/2015 | Li et al. | |
| 2015/0216233 A1 | 8/2015 | Sears et al. | |
| 2015/0216234 A1 | 8/2015 | Chung | |
| 2015/0216236 A1 | 8/2015 | Bless et al. | |
| 2015/0245654 A1 | 9/2015 | Memari et al. | |
| 2015/0245658 A1 | 9/2015 | Worm et al. | |
| 2015/0272217 A1 | 10/2015 | Chen | |
| 2015/0305410 A1 | 10/2015 | Liu | |
| 2015/0313275 A1 | 11/2015 | Anderson et al. | |
| 2015/0313282 A1 | 11/2015 | Ademe et al. | |
| 2015/0328415 A1 | 11/2015 | Minskoff et al. | |
| 2015/0335075 A1 | 11/2015 | Minskoff et al. | |
| 2015/0351456 A1 | 12/2015 | Johnson et al. | |
| 2015/0359265 A1 | 12/2015 | Liu | |
| 2016/0057811 A1 * | 2/2016 | Alarcon ................ | A24F 47/008 |
| | | | 219/494 |
| 2016/0073694 A1 | 3/2016 | Liu | |
| 2016/0091194 A1 | 3/2016 | Liu | |
| 2016/0100633 A1 | 4/2016 | Gao | |
| 2016/0106153 A1 | 4/2016 | Zhu | |
| 2016/0150828 A1 | 6/2016 | Goldstein et al. | |
| 2016/0183596 A1 | 6/2016 | Rado | |
| 2016/0192709 A1 | 7/2016 | Liu | |
| 2016/0227837 A1 | 8/2016 | Hammel et al. | |
| 2016/0242466 A1 | 8/2016 | Lord et al. | |
| 2016/0262453 A1 | 9/2016 | Ampolini et al. | |
| 2016/0309785 A1 | 10/2016 | Holtz | |
| 2016/0309786 A1 | 10/2016 | Holtz et al. | |
| 2016/0309787 A1 | 10/2016 | Hawes et al. | |
| 2016/0309788 A1 | 10/2016 | Hawes et al. | |
| 2016/0324216 A1 | 11/2016 | Li et al. | |
| 2016/0331037 A1 | 11/2016 | Cameron | |
| 2016/0360789 A1 | 12/2016 | Hawes et al. | |
| 2016/0366947 A1 | 12/2016 | Monsees et al. | |
| 2017/0000192 A1 | 1/2017 | Li | |
| 2017/0013880 A1 | 1/2017 | O'Brien et al. | |
| 2017/0042240 A1 | 2/2017 | Murison | |
| 2017/0064999 A1 | 3/2017 | Perez et al. | |
| 2017/0079323 A1 | 3/2017 | Wang | |
| 2017/0150757 A1 | 6/2017 | Worm et al. | |
| 2017/0174914 A1 | 6/2017 | Matsumura et al. | |
| 2017/0231283 A1 | 8/2017 | Gadas | |
| 2017/0325502 A1 | 11/2017 | Nelson et al. | |
| 2018/0007966 A1 | 1/2018 | Li et al. | |
| 2018/0027879 A1 | 2/2018 | Gavrielov et al. | |
| 2018/0161525 A1 | 6/2018 | Liu et al. | |
| 2019/0133187 A1 | 5/2019 | Spencer et al. | |
| 2019/0269178 A1 * | 9/2019 | Karles ..................... | B05D 7/24 |
| 2019/0387805 A1 * | 12/2019 | Rostami ................ | H05B 1/0244 |

FOREIGN PATENT DOCUMENTS

| | | |
|---|---|---|
| CN | 203762291 U | 8/2014 |
| CN | 104720115 A | 6/2015 |
| CN | 205947122 U | 2/2017 |
| CN | 207613205 U | 7/2018 |
| EM | 002337410-0009 | 11/2013 |
| EM | 002337410-0012 | 11/2013 |
| EM | 002403444-0003 | 2/2014 |
| EM | 002412106-0001 | 3/2014 |
| EM | 001420327-0005 | 11/2017 |
| EP | 2574247 A1 | 4/2013 |

(56) References Cited

FOREIGN PATENT DOCUMENTS

| | | |
|---|---|---|
| EP | 3015010 A1 | 5/2016 |
| EP | 3075270 A1 | 10/2016 |
| EP | 3135139 A1 | 3/2017 |
| ES | D0518506-03 | 1/2013 |
| ES | D0517952-09 | 10/2013 |
| ES | D0518082-12 | 11/2013 |
| ES | D0518097-04 | 11/2013 |
| ES | D0518201-12 | 11/2013 |
| ES | D0518036-03 | 12/2013 |
| ES | D0518299-03 | 12/2013 |
| ES | D0518462-09 | 1/2014 |
| ES | D0519904-04 | 9/2014 |
| GB | 4032478 | 11/2013 |
| KR | 10-1486294 B1 | 1/2015 |
| PL | 21430-0001 | 5/2015 |
| PT | 3429-0001 | 11/2013 |
| PT | 3428-0003 | 12/2013 |
| PT | 3771-0007 | 8/2014 |
| RS | 9612-0001 | 3/2000 |
| TR | 201307255-0001 | 1/2014 |
| WO | WO-94/06314 A1 | 3/1994 |
| WO | WO-2007/078273 A1 | 7/2007 |
| WO | WO-2014-066730 A1 | 5/2014 |
| WO | WO-2015/027470 A1 | 3/2015 |
| WO | WO-2015/114327 A1 | 8/2015 |
| WO | WO-2015/124688 A1 | 8/2015 |
| WO | WO-2015131428 A1 | 9/2015 |
| WO | WO-2016/079152 A1 | 5/2016 |
| WO | WO-2016162492 A1 | 10/2016 |
| WO | WO-2017021536 A2 | 2/2017 |
| WO | WO-2017/084849 A1 | 5/2017 |

OTHER PUBLICATIONS

T Spindle, "Examination of Electronic Cigarette User Puff Topography: The Effect of a Mouthpiece-Based Topography Measurement Device on Plasma Nicotine and Subjective Effects", VCU Scholars Compass, Sep. 2015.
U.S. Appl. No. 15/349,377, filed Nov. 11, 2016.
United States Office Action for corresponding U.S. Appl. No. 29/621,730 dated Dec. 17, 2018.
International Search Report and Written Opinion thereof dated Jan. 22, 2019 for corresponding International Application No. PCT/EP2018/077806.
International Search Report and Written Opinion thereof dated Jan. 21, 2019 for corresponding International Application No. PCT/EP2018/077799.
International Search Report and Written Opinion dated Mar. 20, 2019 for corresponding International Application No. PCT/EP2018/086849.
United States Notice of Allowance for U.S. Appl. No. 29/621,730, dated Aug. 14, 2019.
United States Office Action for U.S. Appl. No. 15/858,425, dated Oct. 10, 2019.
International Search Report and Written Opinion thereof dated Nov. 22, 2019 for corresponding International Application No. PCT/EP2019/070556.
International Search Report and Written Opinion for corresponding Application No. PCT/EP2019/070556, dated Nov. 22, 2019.
International Search Report and Written Opinion thereof dated Dec. 12, 2019 for corresponding International Application No. PCT/EP2019/070559.
International Search Report and Written Opinion for corresponding Application No. PCT/EP2019/070559, dated Dec. 12, 2019.
U.S. Office Action dated Jan. 23, 2020 for corresponding U.S. Appl. No. 15/729,895.
U.S. Notice of Allowance dated Jan. 29, 2020 for corresponding U.S. Appl. No. 15/858,425.
Atomizer & Coil: Authentic GS-H5L 3.0 ml BCC Atomizer with LED light, http://www.ecigaretteb2c.com (Year: 2014).
United States Office Action for U.S. Appl. No. 15/729,895, dated Jan. 23, 2020.
U.S. Notice of Allowance dated Feb. 24, 2020 for corresponding U.S. Appl. No. 15/858,425.
International Preliminary Report on Patentability dated Apr. 23, 2020 for corresponding International Application No. PCT/EP2018/077806.
U.S. Notice of Allowance dated May 6, 2020 for corresponding U.S. Appl. No. 15/729,895.
Written Opinion of the International Preliminary Examining Authority dated Jun. 10, 2020 for corresponding International Application No. PCT/EP2019/070559.
International Preliminary Report on Patentability and Written Opinion thereof dated Jul. 9, 2020 for corresponding International Application No. PCT/EP2018/086849.
International Preliminary Report on Patentability dated Jun. 30, 2020 for corresponding International Application No. PCT/EP2019/070556.

\* cited by examiner

ELECTRONIC VAPING DEVICE WITH OUTLET-END ILLUMINATION

CROSS-REFERENCE TO RELATED APPLICATION

This is a continuation application of U.S. application Ser. No. 15/858,425, filed Dec. 29, 2017, the entire contents of each of which are incorporated herein by reference.

BACKGROUND

Field

The present disclosure relates to electronic vaping devices, e-vaping devices, and/or non-combustible vaping devices.

Description of Related Art

An e-vaping device includes a heater element which vaporizes a pre-vapor formulation to generate a "vapor," sometimes referred to herein as a "generated vapor."

The e-vaping device includes a power supply, such as a rechargeable battery, arranged in the device. The battery is electrically connected to the vapor generator, such that the heater element therein heats to a temperature sufficient to convert a pre-vapor formulation to a generated vapor. The generated vapor exits the e-vaping device through an outlet-end insert that includes an outlet.

SUMMARY

According to some example embodiments, a cartridge for an e-vaping device may include a structural element at least partially defining a reservoir, the reservoir configured to hold a pre-vapor formulation, a vapor generator configured to draw the pre-vapor formulation from the reservoir and to heat the drawn pre-vapor formulation to form a generated vapor, a housing extending along a longitudinal axis of the cartridge, and an outlet-end insert coupled to the housing. The housing may at least partially enclose the reservoir and the vapor generator. The housing may have a tip end and an outlet end. The housing may be configured to channel light from the tip end of the housing to the outlet end of the housing via internal reflection through an interior of the housing. The outlet-end insert may be coupled to the outlet end of the housing. The outlet-end insert may include at least one outlet in flow communication with the vapor generator. The outlet-end insert may be configured to direct the generated vapor out of the cartridge through the at least one outlet. The outlet-end insert may be further configured to emit the channeled light.

The housing may be configured to receive, at the tip end of the housing, light emitted from a light source that is external to the cartridge through an opening at a tip end of the cartridge.

The cartridge may further include a light source at a tip end of the cartridge. The light source may be configured to emit at least a portion of the received light.

The light source may be configured to emit light having a selected color of a plurality of colors.

The outlet-end insert may be configured to channel the channeled light substantially exclusively through an outlet-end surface of the outlet-end insert. The outlet-end surface may extend substantially orthogonally to a longitudinal axis of the cartridge.

The housing and the outlet-end insert may be included in an individual integral element.

At least the housing may be transparent to visible light in a direction that is substantially orthogonal to the longitudinal axis of the cartridge.

According to some example embodiments, an e-vaping device may include a cartridge and a power supply section. The cartridge may include a structural element at least partially defining a reservoir, the reservoir configured to hold a pre-vapor formulation, a vapor generator configured to draw the pre-vapor formulation from the reservoir and to heat the drawn pre-vapor formulation to form a generated vapor, a housing extending along a longitudinal axis of the cartridge, and an outlet-end insert coupled to the housing. The housing may at least partially enclose the reservoir and the vapor generator. The housing may have a tip end and an outlet end. The housing may be configured to channel light from the tip end of the housing to the outlet end of the housing via internal reflection through an interior of the housing. The outlet-end insert may be coupled to the outlet end of the housing. The outlet-end insert may include at least one outlet in flow communication with the vapor generator. The outlet-end insert may be configured to direct the generated vapor out of the cartridge through the at least one outlet. The outlet-end insert may be further configured to emit the channeled light. The power supply section may be configured to supply electrical power to the cartridge to cause the vapor generator to form the generated vapor.

The e-vaping device may further include a light source included in one of the cartridge and the power supply section. The light source may be configured to emit light based on electrical power received from the power supply section. The housing may be configured to receive at least a portion of the light emitted by the light source at the tip end of the housing.

The e-vaping device may further include control circuitry configured to activate the light source based on a determination that air is being drawn through at least a portion of the e-vaping device. The control circuitry further may be configured to cause the light source to remain activated for at least a particular period of elapsed time following a cessation of air being drawn through at least the portion of the e-vaping device.

The light source may be configured to emit light having a particular property. The particular property may be a color of the light and/or a brightness of the light. The control circuitry may be further configured to control the particular property of the light emitted by the light source, based on a determination that the light source has emitted light for at least a threshold period of elapsed time, a determined amount of pre-vapor formulation held in the reservoir, a determined amount of electrical charge held in the power supply section, and/or a magnitude of generated vapor that is generated by the vapor generator.

The outlet-end insert may be configured to channel the channeled light substantially exclusively through an outlet-end surface that extends at least partially orthogonally to a longitudinal axis of the cartridge.

The housing and the outlet-end insert may be included in an individual integral element.

At least the housing may be transparent to visible light in a direction that is substantially perpendicular to the longitudinal axis of the cartridge.

At least the power supply section may include a housing that is opaque to visible light.

The power supply section and the cartridge may be configured to be removably coupled together.

The power supply section may include a rechargeable battery.

According to some example embodiments, a method for operating an e-vaping device may include determining that at least a threshold flow of air is being drawn through at least an outlet-end insert of the e-vaping device, and controlling a light source of the e-vaping device to emit light through an interior of the e-vaping device based on the determining, such that the light is transmitted through an interior of a housing of the e-vaping device to the outlet-end insert, and the outlet-end insert emits the channeled light.

The light source may be configured to emit light having a particular property. The particular property may be a color of the light and/or a brightness of the light. The controlling may include controlling the particular property of the light emitted by the light source, based on a determination that the light source has emitted light for at least a threshold period of elapsed time, a determined amount of pre-vapor formulation held in a reservoir of the e-vaping device, a determined amount of electrical charge held in a power supply section of the e-vaping device, and/or a magnitude of generated vapor that is generated by a heating element of the e-vaping device.

The outlet-end insert may be configured to channel the channeled light substantially exclusively through an outlet-end surface that extends at least partially orthogonally to a longitudinal axis of the e-vaping device.

The housing and the outlet-end insert may be included in an individual integral element.

At least the housing may be transparent to visible light in a direction that is substantially perpendicular to a longitudinal axis of the e-vaping device.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Figures 1A, 1B, 1C:
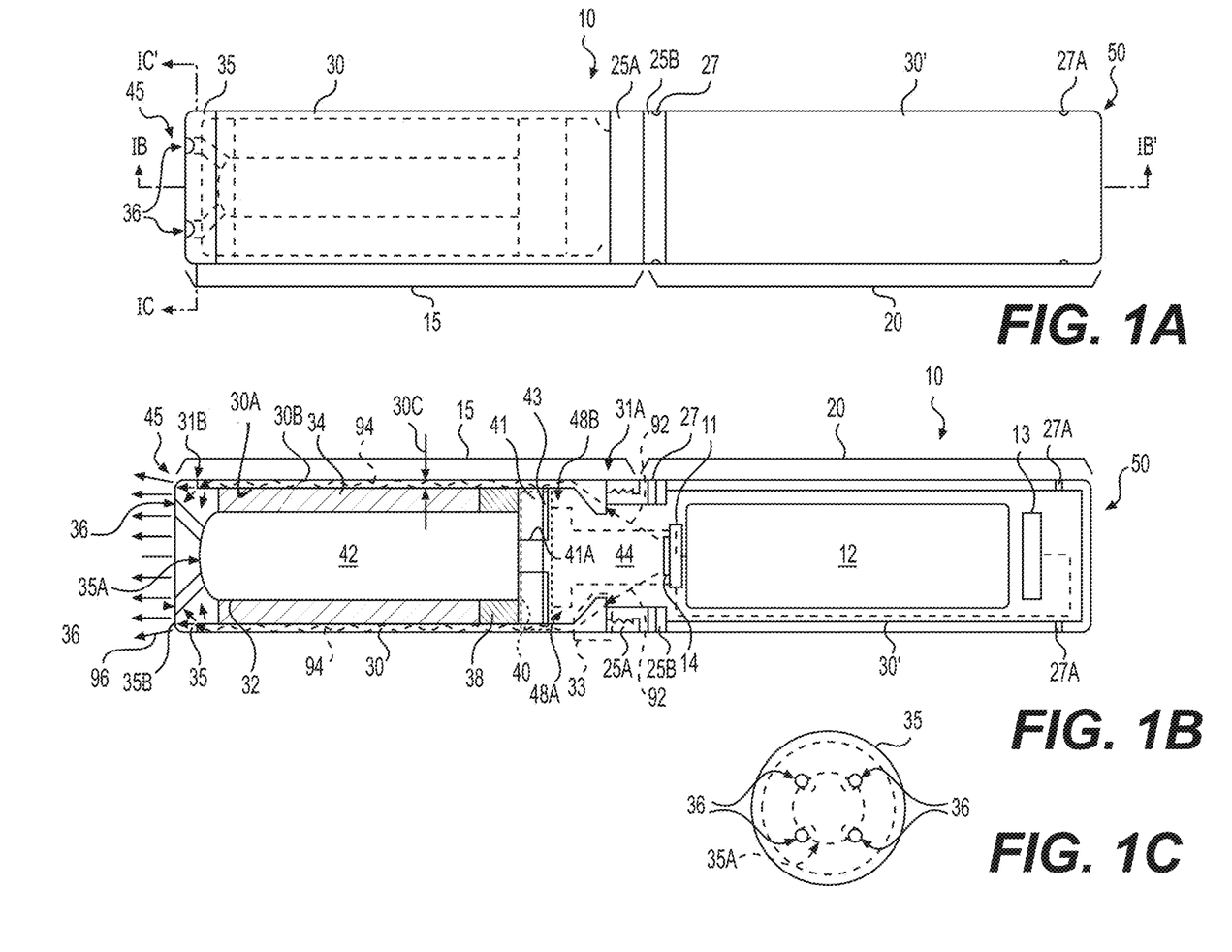
FIG. 1A is a side view of an e-vaping device, according to some example embodiments.
FIG. 1B is a longitudinal cross-sectional view along line IB-IB' of the e-vaping device of FIG. 1A.
FIG. 1C is an orthogonal cross-sectional view along line IC-IC' of the e-vaping device of FIG. 1A.

FIG. 1A is a side view of an e-vaping device 10, according to some example embodiments. FIG. 1B is a longitudinal cross-sectional view along line IB-IB' of the e-vaping device 10 of FIG. 1A. FIG. 1C is an orthogonal cross-sectional view along line IC-IC' of the e-vaping device 10 of FIG. 1A.

In at least one example embodiment, as shown in FIGS. 1A-1B, an electronic vaping device (e-vaping device) 10 may include a replaceable cartridge (or first section) 15, sometimes referred to herein as an "e-vaping tank," and a reusable battery section (or second section, also referred to herein as a power supply section) 20, which may be coupled together at the respective interfaces 25A, 25B. The interfaces 25A, 25B may be configured to be removably coupled together, such that the first section 15 and the second section 20 are configured to be removably coupled together. It should be appreciated that each interface (also referred to herein as a connector) of the interfaces 25A, 25B may be any type of interface, including a snug-fit, detent, clamp, bayonet, and/or clasp. In the example embodiments shown in FIGS. 1A-1C, air inlet ports 27 extend through a portion of the interface 25B. It will be appreciated that, in some example embodiments, an air inlet port 27 may extend through a separate portion of the e-vaping device 10, including, for example, interface 25A.

In some example embodiments, at least one air inlet port 27 may be formed in first housing 30, second housing 30', interface 25A, and/or interface 25B. In some example embodiments, the air inlet ports 27 may be machined with precision tooling such that their diameters are closely controlled and replicated from one e-vaping device 10 to the next during manufacture.

In some example embodiments, the air inlet ports 27 may be drilled with carbide drill bits or other high-precision tools and/or techniques. In some example embodiments, the first housing 30 and/or second housing 30' may be at least partially formed of metal or metal alloys such that the size and shape of the air inlet ports 27 may not be altered during manufacturing operations, packaging, and vaping. Thus, the air inlet ports 27 may provide consistent resistance to draw ("RTD"). In some example embodiments, the air inlet ports 27 may be sized and configured such that the e-vaping device 10 has a RTD in the range of from about 60 mm $H_2O$ to about 150 mm $H_2O$.

In some example embodiments, one or more interfaces of the interfaces 25A, 25B may be the connector described in U.S. application Ser. No. 15/154,439, filed May 13, 2016 and published as U.S. Application Pub. No. 2017/0325502 on Nov. 16, 2017, the entire contents of which is incorporated herein by reference thereto. As described in U.S. application Ser. No. 15/154,439, published as U.S. Application Pub. No. 2017/0325502 on Nov. 16, 2017, an interface of the interfaces 25A, 25B may be formed by a deep drawn process.

In some example embodiments, the first section 15 may include the first housing 30 and the second section 20 may include the second housing 30'. The e-vaping device 10 includes an outlet-end insert 35 at a first end. As referred to herein, the first end of the e-vaping device 10 may be referred to as an outlet end 45 of the e-vaping device 10. In some example embodiments, the outlet-end insert 35 and the first housing 30 may be transparent to visible light in one or more directions. The outlet-end insert 35 and the first housing 30 may at least partially comprise a transparent material, including one or more of a transparent plastic material, a transparent glass material, some combination thereof, or the like.

Referring to FIGS. 1A-1B, in some example embodiments, the first section 15 may include a structural element (also referred to herein as an inner tube 32) at least partially defining a reservoir 34 configured to hold a pre-vapor formulation, a vapor generator 40 configured to draw the pre-vapor formulation from the reservoir 34 and to heat the drawn pre-vapor formulation to form a generated vapor, and a first housing 30 extending along a longitudinal axis of the first section 15, and the outlet-end insert 35 coupled to an outlet end 31B of the first housing 30. The first housing 30 may at least partially enclose the reservoir 34 and the vapor generator 40. The first housing 30 has a tip end 31A and the outlet end 31B. The outlet-end insert 35 may include a cavity 35A and at least one outlet air port 36 in flow communication with the vapor generator 40 via at least the cavity 35A. The outlet-end insert 35 may be configured to direct a generated vapor, generated at the vapor generator 40, out of the first section 15 through the at least one outlet air port 36.

In some example embodiments, the first housing 30 and/or the second housing 30' is transparent to visible light in a direction that is substantially orthogonal to the longitudinal axis of the first section 15. In some example embodiments, the second housing 30' and/or the first housing 30 may be opaque to visible light.

As described further below, the first housing 30 may be configured to channel light through an interior of the first housing 30 via internal reflection. For example, as shown in FIG. 1B, the first housing 30 may receive light 92 at the tip end 31A of the first housing 30, and the light 92 may be channeled, as internally-reflected light 94, through an interior (thickness 30C) of the first housing 30 from the tip end 31A to the outlet end 31B thereof based on internal reflection of the internally-reflected light 94 between an inner surface 30A of the first housing 30 and an outer surface 30B of the first housing 30.

As shown in FIG. 1B, the first housing 30 may include a tip-end portion 33 that is configured to receive light 92 at the tip end 31A of the first housing 30 into the interior of the first housing 30. As shown, the tip-end portion 33 is configured to enable the light 92 to pass into the interior of the first housing 30 such that the light is internally-reflected through the thickness 30C of the first housing 30, from the tip end 31A of the first housing 30 to the outlet end 31B of the first housing, as internally-reflected light 94 between the inner surface 30A of the first housing 30 and the outer surface 30B of the first housing 30.

As further described below, the internally-reflected light 94 may be directed ("emitted") from the outlet end 31B of the first housing 30 to the outlet-end insert 35, where the light may be further channeled through the outlet-end insert 35 to be emitted from the e-vaping device 10 as emitted light 96. As shown in FIG. 1B, the emitted light 96 may be emitted at least partially from an outlet-end surface 35B of the outlet-end insert 35, where the outlet-end surface 35B extends at least partially orthogonally to a longitudinal axis of the first section.

Referring back to FIGS. 1A-1B, the first section 15 may include the inner tube 32 that defines an inner longitudinal boundary of the reservoir 34, and the first housing 30 may define an outer longitudinal boundary of the reservoir 34, such that the reservoir 34 is an annular cylindrical reservoir 34 in the first section 15. As further shown in FIG. 1B, the outlet-end insert 35 may define an outlet-end boundary of the reservoir 34, and the first section 15 may include a transfer pad 38 that defines a tip end of the reservoir 34. In some example embodiments, the first section 15 may include a gasket assembly (not shown in FIGS. 1A-1C) that defines an outlet end of the reservoir 34, such that the gasket assembly is between the reservoir 34 and the outlet-end insert 35.

The inner tube 32 may define at least a portion of a channel 42 extending through the first section 15. As shown in FIG. 1B, the tip end of the inner tube 32 is coupled with the transfer pad 38 such that the tip end of the inner tube 32 extends through the transfer pad 38 and the inner tube 32 defines the channel 42 such that the channel 42 is in fluid communication with a conduit 41A, described further below. As further shown in FIG. 1B, the outlet end of the inner tube 32 is coupled with the outlet-end insert 35, at cavity 35A with which the outlet air ports 36 are in fluid communication, such that the inner tube 32 defines the channel 42 such that the channel 42 is in fluid communication with the outlet air ports 36.

The reservoir 34 may be refillable via a reservoir opening using any commercially-available pre-vapor formulation in order to continually reuse first section 15. In some example embodiments, the reservoir opening is included in the outlet-end insert and enables access to the reservoir 34 from an exterior of the first section 15.

As shown in FIG. 1B, the transfer pad 38 provides a seal with the first housing 30 and further is configured to transport pre-vapor formulation from the reservoir 34 and between opposite (outlet-end and tip-end) surfaces of the transfer pad 38 to a dispensing interface 41 that is described further below.

In some example embodiments, the transfer pad 38 includes a plurality of fibers. Each fiber of the plurality of fibers may be substantially parallel to a longitudinal axis of the e-vaping device 10. The transfer pad 38 may be formed of at least one of polypropylene and polyester. The transfer pad 38 may be formed by melt blowing, which is a process by which micro- and/or nano-fibers are formed from at least one polymer that is melted and extruded through small nozzles surrounded by high speed blowing gas and/or air.

The polymers used in the melt blowing process do not include any processing aids, such as antistatics, lubricants, bonding agents, and/or surfactants. Thus, the polymers are substantially pure and the transfer pad 38 is inert to the pre-vapor formulation. In some example embodiments, the polymers may be mixed with processing aids, such as antistatics, lubricants, bonding agents, and/or surfactants. The transfer pad 38 may be obtained from Essentra Public Limited Company (PLC).

In some example embodiments, the transfer pad 38 includes an outer side wall. The outer side wall may have a coating thereon that aids in reducing leakage and/or forming a seal between the transfer pad 38 and an inner surface of the first housing 30. In some example embodiments, the transfer pad 38 includes a plurality of channels. Each of the plurality of channels is between adjacent ones of the plurality of fibers.

In some example embodiments, about 50% to about 100% (e.g., about 55% to about 95%, about 60% to about 90%, about 65% to about 85%, or about 70% to about 75%) of the plurality of fibers extend substantially in the longitudinal axis of the e-vaping device 10. In some example embodiments, about 75% to about 95% (e.g., about 80% to about 90% or about 82% to about 88%) of the plurality of fibers extend substantially in the longitudinal axis.

The transfer pad 38 may be generally cylindrical or disc shaped, but the transfer pad is not limited to cylindrical or disc shaped forms and a shape of the transfer pad may depend on a shaped of the reservoir and housing. An outer diameter of the transfer pad 38 may range from about 3.0 mm to about 20.0 mm (e.g., about 5.0 mm to about 18.0 mm, about 7.0 mm to about 15.0 mm, about 9.0 mm to about 13.0 mm, or about 10.0 mm to about 12.0 mm).

In some example embodiments, the transfer pad 38 is oriented, such that the channels mostly transverse to the longitudinal axis of the first housing 30 (where the longitudinal axis of the first housing 30 may be the longitudinal axis of the e-vaping device 10). In some example embodiments, the transfer pad 38 is oriented, such that the channels do not run transverse to the longitudinal axis of the first housing 30.

While not wishing to be bound by theory, it is believed that the pre-vapor formulation travels through the channels, and a diameter of the channels is such that a liquid surface tension and pressurization within the reservoir moves and holds the pre-vapor formulation within the channel without leaking.

Based on the Hagen-Poiseuille equation and principles of capillary action, it is believed that the flow rate of the pre-vapor formulation through the channels is directly proportional to the channel pore size and the liquid surface tension. Moreover, it is believed that the flow rate of the pre-vapor formulation through the channels is inversely proportional to the liquid viscosity and channel length.

In some example embodiments, the transfer pad 38 has a density ranging from about 0.08 g/cc to about 0.3 g/cc (e.g., about 0.01 g/cc to about 0.25 g/cc or about 0.1 g/cc to about 0.2 g/cc). The transfer pad 38 has a length ranging from about 0.5 millimeter (mm) to about 10.0 mm (e.g., about 1.0 mm to about 9.0 mm, about 2.0 mm to about 8.0 mm, about 3.0 mm to about 7.0 mm, or about 4.0 mm to about 6.0 mm). In some example embodiments, as the density of the transfer pad 38 increases, the length of the transfer pad decreases. Thus, transfer pads 38 having lower densities within the above-referenced range may be longer than transfer pads 38 having higher densities.

In some example embodiments, the transfer pad 38 has a length of about 5.0 mm to about 10.0 mm and a density of about 0.08 g/cc to about 0.1 g/cc.

In some example embodiments, the transfer pad 38 has a length of about 0.5 mm to about 5.0 mm and a density of about 0.1 g/cc to about 0.3 g/cc.

In some example embodiments, the density and/or length of the transfer pad 38 is chosen based on the viscosity of a liquid flowing therethrough. Moreover, the density of the transfer pad 38 is chosen based on desired vapor mass, desired flow rate of the pre-vapor formulation flow rate, and the like.

As shown in FIG. 1B, the vapor generator 40 includes the dispensing interface 41, where the dispensing interface 41 is configured to draw pre-vapor formulation from the reservoir 34, and a heating element 43 configured to vaporize the drawn pre-vapor formulation to form a generated vapor.

The dispensing interface 41 is coupled to the transfer pad 38, such that the dispensing interface 41 may extend transversely over at least a portion of the tip-end side of the transfer pad 38. As described above, the transfer pad 38 is configured to transport pre-vapor formulation from the reservoir 34 to the tip-end side of the transfer pad 38. Thus, the dispensing interface 41 is in fluid communication with the reservoir 34 via the transfer pad 38. As a result, the dispensing interface 41 is configured to transport pre-vapor formulation from the reservoir 34 through the transfer pad 38 to the heating element 43.

The heating element 43 is configured to generate heat. As shown in FIG. 1B, the heating element 43 is coupled to the tip-end side of the dispensing interface 41 and may extend along the surface of the tip-end side of the dispensing interface 41.

The dispensing interface 41 is configured to draw pre-vapor formulation from the transfer pad 38, such that the pre-vapor formulation may be vaporized from the dispensing interface 41 based on heating of the dispensing interface 41 by the heating element 43.

During vaping, pre-vapor formulation may be transferred from the reservoir 34 and/or storage medium in the proximity of the heating element 43 via capillary action of the dispensing interface 41. As shown, the heating element 43 may at least partially extend along a tip-end side of the dispensing interface 41 such that when the heating element 43 is activated to generate heat, the pre-vapor formulation in the portion of the dispensing interface 41 that is proximate to the tip-end side of the dispensing interface 41 may be vaporized by the heating element 43 to form a generated vapor.

As shown in FIG. 1B, the dispensing interface includes the conduit 41A, where the conduit 41A is extending through the dispensing interface 41 and in fluid communication with the channel 42 of the inner tube 32.

Still referring to FIG. 1B, first section 15 includes an interior space 44 at a backside (tip-end) portion of the vapor generator 40. The interior space 44 is at least partially defined by first housing 30, interface 25A, and vapor generator 40. The interior space 44 assures communication between the channel 42 and one or more air inlet ports 27 that may extend between the interior space 44 and an exterior of the e-vaping device 10. Thus, the conduit 41A establishes fluid communication between the air inlet ports 27 and the channel 42 via the interior space 44, thereby enabling air to be drawn into the channel 42 from the air inlet ports 27.

In some example embodiments, generated vapor that is generated by the vapor generator 40 based on the heating element 43 vaporizing at least some pre-vapor formulation drawn into the dispensing interface 41 from the reservoir 34 may be at least partially entrained in air drawn into the channel 42 from the air inlet ports 27. As a result, the generated vapor may be drawn through the channel 42 to the cavity 35A. The generated vapor may then be drawn out of the e-vaping device via outlet air ports 36 in the outlet-end insert 35.

Referring to FIGS. 1A-1C, the first section 15 includes the outlet-end insert 35 coupled to the first housing 30 and the inner tube 32, such that the outlet-end insert 35 both defines an outlet-end side of the reservoir 34 and establishes fluid communication between the cavity 35A and outlet air ports 36 of the outlet-end insert 35 with the channel 42. In some example embodiments, the first section 15 may further include a gasket assembly between the outlet-end insert 35 and the inner tube 32, such that the outlet-end insert 35 is connected to the first housing 30 and is in fluid communication with the channel 42 via one or more conduits extending through the gasket assembly.

As shown in FIG. 1A-1C, the outlet-end insert 35 includes one or more outlet air ports 36 that extend at least partially through the outlet-end insert 35. As further shown, the outlet-end insert 35 may include the cavity 35A where the cavity 35A is connected to the outlet air ports 36. As shown, the outlet-end insert 35 may be coupled to the inner tube 32 such that the cavity is in direct fluid communication with an outlet end of the channel 42, thereby establishing fluid communication between the outlet air ports 36 and the channel 42 via the cavity 35A. As a result, air drawn through the channel 42 towards the outlet end of the e-vaping device 10 may be drawn out of the e-vaping device via the cavity 35A and one or more of the outlet air ports 36.

Still referring to FIGS. 1A-1C, the outlet-end insert 35 may be configured to receive internally-reflected light 94 channeled through an interior (thickness 30C) of the first housing 30 between the inner surface 30A of the first housing 30 and the outer surface 30B of the first housing 30, channel the received light through at least a portion of the interior of the outlet-end insert 35, and emit the channeled light as emitted light 96 through at least one surface of the outlet-end insert 35.

For example, as shown in FIG. 1B, the outlet-end insert 35 may receive internally-reflected light 94 from the first housing 30 at an interface between the outlet-end insert 35 and the outlet end 31B of the first housing 30. The outlet-end insert 35 may further channel the received light, based on one or more of internal reflection, refraction, transmission, etc., to the outlet-end surface 35B of the outlet-end insert 35, thereby enabling the light to be emitted as emitted light 96, such that the light 96 is emitted in one or more directions that are orthogonal or substantially orthogonal to the outlet-end surface 35B. In some example embodiments, the light may be at least partially emitted through one or more outer sidewalls of the outlet-end insert 35. In some example embodiments, the outlet-end insert 35 is configured to channel the received light substantially exclusively through an outlet-end surface 35B that extends at least partially orthogonally to a longitudinal axis of the first section 15.

As described further below, the internally-reflected light 94 that is channeled through the first housing 30 via internal reflection and emitted through a surface of the outlet-end insert 35 as emitted light 96 may provide an indication of one or more instances of information to an adult vapor from an outlet-end of the e-vaping device 10. For example, as further described below, the light 92 that is received by the first housing 30 and channeled therethrough may be emitted by a light source in the e-vaping device 10, where the light source emits the light 92 to have one or more particular properties associated with particular information, such that the emitted light 96 indicates the particular information to an adult vaper observing the emitted light 96.

In some example embodiments, an e-vaping device 10 may be configured to be manipulated by an adult vaper such that the outlet end 45 of the e-vaping device 10 is proximate to the adult vaper and a tip end 50 is distal to the adult vaper. Because the e-vaping device 10 may be configured to emit the emitted light 96 through a surface of the outlet-end insert 35, based on the internally-reflected light 94 being channeled through an interior of the first housing 30 via internal reflection, the light 96 may be emitted towards an adult vaper manipulating the e-vaping device 10.

Thus, where the emitted light 96 is emitted to provide an indication of information to the adult vaper, an e-vaping device 10 that is configured to emit the light 96 through the outlet-end insert 35 may be configured to provide improved visibility of the information-indicating light 96 to an adult vaper manipulating the e-vaping device 10, thereby improving the ability of the e-vaping device 10 to communicate information to an adult vaper manipulating the e-vaping device 10.

In addition, because the e-vaping device 10 is configured to emit light 96 from the outlet-end insert 35 of the e-vaping device 10, the e-vaping device 10 is configured to reduce the visibility of the emitted light 96 to other portions of a proximate environment in which an adult vaper is located (e.g., away from the adult vaper).

As a result, the transmission of the emitted light 96 to the surrounding environment may be at least partially restricted to the adult vaper, thereby at least partially restricting the recipients of information communicated by the emitted light 96 to the adult vaper to which the outlet end 45 may be proximate. Furthermore, the reduced transmission of the emitted light 96 to the surrounding environment may improve privacy for the adult vaper, as observability of the emitted light 96 may be at least partially restricted to the adult vaper manipulating the e-vaping device.

Still referring to FIG. 1B, the e-vaping device 10 includes electrical pathways 48A, 48B that may electrically couple at least the heating element 43 to a power supply 12 included in the second section 20. The electrical pathways 48A, 48B may include one or more electrical connectors. In some example embodiments, if and/or when interfaces 25A, 25B are coupled together, the heating element 43 and the power supply 12 may be electrically coupled together via electrical pathways 48A, 48B.

In some example embodiments, one or more of the interfaces 25A, 25B include one or more of a cathode connector and an anode connector, such that, if and/or when interfaces 25A, 25B are coupled together, the coupled interfaces 25A, 25B may electrically couple the heating element 43 and the power supply 12 together.

If and/or when interfaces 25A, 25B are coupled together, one or more electrical circuits through the first section 15 and the second section 20 may be established ("closed"). The established electrical circuits may include at least the heating element 43, a control circuitry 11, the power supply 12, and a light source 14. The electrical circuit may include electrical pathways 48A, 48B, interfaces 25A, 25B, and/or a sensor 13.

Still referring to FIG. 1A and FIG. 1B, the second section 20 includes the second housing 30' extending in a longitudinal direction, the sensor 13, where the sensor 13 is responsive to air drawn into the second section 20 via an air inlet port 27A adjacent to a free end or tip end 50 of the e-vaping device 10, at least one power supply 12, control circuitry 11, and light source 14. The power supply 12 may include a rechargeable battery. The sensor 13 may be one or more of a pressure sensor, a microelectromechanical system (MEMS) sensor, etc.

In some example embodiments, the power supply 12 includes a battery arranged in the e-vaping device 10 such that the anode is downstream of the cathode. A connector element included in the electrical pathway 48B may contact the downstream end of the battery. The heating element 43 may be coupled to the power supply 12 by at least the two spaced apart electrical leads included in the separate, respective electrical pathways 48A, 48B, the interfaces 25A, 25B, sensor 13, light source 14, and/or control circuitry 11.

The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The e-vaping device 10 may be usable by an adult vaper until the energy in the power supply 12 is depleted or in the case of lithium polymer battery, a minimum voltage cut-off level is achieved.

Further, the power supply 12 may be rechargeable and may include circuitry configured to allow the battery to be chargeable by an external charging device. To recharge the e-vaping device 10, a Universal Serial Bus (USB) charger or other suitable charger assembly may be used.

Upon completion of the connection between the first section 15 and the second section 20, the power supply 12 may be electrically connected with the heating element 43 of the vapor generator 40 upon actuation of the sensor 13. Air is drawn primarily into the first section 15 through one or more air inlet ports 27. The one or more air inlet ports 27 may be located along the first and second housings 30 and 30' of the first and second sections 15, 20 or at one or more of the coupled interfaces 25A, 25B.

The sensor 13 may be configured to sense an air pressure drop and initiate application of voltage from the power supply 12 to the heating element 43 of the vapor generator 40. In addition, the at least one air inlet port 27A may be located adjacent to the sensor 13, such that the sensor 13 may sense air flow indicative of vapor being drawn through the outlet end of the e-vaping device 10. The sensor 13 may activate the power supply 12 and the light source 14.

Referring to FIG. 1B, the e-vaping device 10 may include the light source 14. The light source 14 may be configured to glow when the heating element 43 is activated. The light source 14 may include a light emitting diode (LED). As shown, the light source 14 may be located proximate to an outlet end of the second section 20. For example, the light source 14 may be coupled to the control circuitry 11. As shown, the light source 14 may be configured to emit light 92 that passes through the opening at the interface between interfaces 25A, 25B, such that the light 92 enters the first section 15 through an opening at the tip end of the first section 15, passes through interior space 44, and is received into the first housing 30 interior via the tip end portion at the tip end 31A of the first housing 30.

In some example embodiments, the sensor 13 is configured to generate an output indicative of a magnitude and direction of airflow in the e-vaping device 10. The control circuitry 11 receives the output of the sensor 13, and determines if (1) a direction of the airflow in flow communication with the sensor 13 indicates a draw on the outlet-end insert 35 (e.g., a flow through the outlet-end insert 35 towards an exterior of the e-vaping device 10 from the channel 42) versus blowing (e.g., a flow through the outlet-end insert 35 from an exterior of the e-vaping device 10 towards the channel 42) and (2) the magnitude of the draw (e.g., flow velocity, volumetric flow rate, mass flow rate, some combination thereof, etc.) exceeds a threshold level. If and/or when the control circuitry 11 determines that the direction of the airflow in flow communication with the sensor 13 indicates a draw on the outlet-end insert 35 (e.g., a flow through the outlet-end insert 35 towards an exterior of the e-vaping device 10 from the channel 42) versus blowing (e.g., a flow through the outlet-end insert 35 from an exterior of the e-vaping device 10 towards the channel 42) and the magnitude of the draw (e.g., flow velocity, volumetric flow rate, mass flow rate, some combination thereof, etc.) exceeds a threshold level, the control circuitry 11 may electrically connect the power supply 12 to the heating element 43, thereby activating the vapor generator 40. Namely, the control circuitry 11 may selectively electrically connect the electrical pathways 48A, 48B in a closed electrical circuit (e.g., by activating a heater power control circuit included in the control circuitry 11) such that the heating element 43 becomes electrically connected to the power supply 12. In some example embodiments, the sensor 13 may indicate a pressure drop, and the control circuitry 11 may activate the vapor generator 40 in response thereto.

In some example embodiments, the control circuitry 11 may include a time-period limiter. In some example embodiments, the control circuitry 11 may include a manually operable switch for an adult vaper to initiate heating. The time-period of the electric current supply to the heating element 43 of the vapor generator 40 may be set or pre-set depending on the amount of pre-vapor formulation desired to be vaporized. In some example embodiments, the sensor 13 may detect a pressure drop and the control circuitry 11 may supply power to the heating element 43 as long as heater activation conditions are met. Such conditions may include one or more of the sensor 13 detecting a pressure drop that at least meets a threshold magnitude, the control circuitry 11 determining that a direction of the airflow in flow communication with the sensor 13 indicates a draw on the outlet-end insert 35 (e.g., a flow through the outlet-end insert 35 towards an exterior of the e-vaping device 10 from the channel 42) versus blowing (e.g., a flow through the outlet-end insert 35 from an exterior of the e-vaping device 10 towards the channel 42), and the magnitude of the draw (e.g., flow velocity, volumetric flow rate, mass flow rate, some combination thereof, etc.) exceeds a threshold level.

In some example embodiments, the control circuitry 11 may include a maximum, time-period limiter. In some example embodiments, the control circuitry 11 may include a manually operable switch for an adult vaper to initiate a vaping. The time-period of the electric current supply to the heating element 43 may be given, or alternatively pre-set (e.g., prior to controlling the supply of electrical power to the heating element 43), depending on the amount of pre-vapor formulation desired to be vaporized. In some example embodiments, the control circuitry 11 may control the supply of electrical power to the heating element 43 as long as the sensor 13 detects a pressure drop.

Still referring to FIG. 1B, in some example embodiments, the control circuitry 11 is configured to control the supply of electrical power to the light source 14 to control one or more particular properties of the light 92 emitted by the light source 14, such that the emitted light 92, when emitted as emitted light 96, communicates information based on the one or more particular properties of the emitted light. The one or more particular properties of the light may include a color temperature of the emitted light 92 and/or a brightness of the emitted light 92 and/or a length of time ("period of elapsed time") that the light 92 is emitted by the light source 14. As referred to herein, a "color temperature" of emitted light may be referred to as a "color" of the emitted light.

The control circuitry 11 may monitor one or more properties associated with the e-vaping device 10. For example, the control circuitry 11 may determine ("monitor," "track," "calculate," etc.) an amount of pre-vapor formulation held in the reservoir 34, an amount of electrical energy ("electrical charge") held in the power supply 12, a magnitude of generated vapor that is generated by the vapor generator 40 during one or more individual instances of generating the vapor a flow rate of air through at least a portion of the e-vaping device 10, some combination thereof, or the like. Such properties associated with the e-vaping device 10 may be referred to herein as "e-vaping device properties." The control circuitry 11 may monitor the one or more e-vaping device properties, based on processing sensor data generated by one or more sensor devices in the e-vaping device 10, including information received through a communication interface of the e-vaping device 10.

In some example embodiments, the control circuitry 11 may control the supply of electrical power to the light source 14 to control the one or more properties of the light 92 emitted by the light source 14 such that the emitted light 92 has properties that correspond to the one or more e-vaping device properties monitored by the control circuitry 11.

As referred to herein, properties of the light 92 may be the same or substantially the same (e.g., the same within manufacturing tolerances and/or material tolerances) as the properties of the emitted light 96. The control circuitry 11 may thus enable the e-vaping device 10 to emit an emitted light 96 that has one or more properties corresponding to the one or more e-vaping device properties, such that the e-vaping device 10 may communicate, to an adult vaper observing the outlet end 45 of the first section 15, information indicating one or more properties of the e-vaping device 10.

In an example, the control circuitry 11 may, based on both determining that electrical power is to be supplied to the heating element 43 to cause vapor to be generated and further determining that one or more monitored e-vaping device properties at least meet one or more threshold values and/or are within one or more ranges, control the supply of electrical power to the light source 14 so that the light source 14 emits light 92 having one or more properties determined by the control circuitry 11 to correspond to the one or more e-vaping device properties.

The correspondence ("association," "relationship," etc.) between various light 92 properties and various particular e-vaping device properties, including correspondence between particular values and/or ranges of values thereof, may be stored in a look-up table that may be further stored in a memory. The memory may be included in the e-vaping device 10, including within the control circuitry 11. The control circuitry may, upon determining a value of an e-vaping device property based on processing data from a sensor device, access the look-up table to determine a corresponding property value of at least one property of light 92 to be emitted by the light source 14. The control circuitry 11 may further determine one or more corresponding properties of the electrical power to be supplied to the light source 14 to cause the light source 14 to emit light 92 having the at least one property identified in the look-up table.

In an example, the control circuitry 11 may be configured to cause the light source 14 to emit light 92 having a particular color temperature and brightness based on vapor being generated by the vapor generator 40. The color temperature of the emitted light 92, in a range of color temperatures, may be proportional to an amount of electrical charge held in the power supply 12. The brightness of the light 92 may be proportional to an amount of pre-vapor formulation held in the reservoir 34. Thus, the color temperature and brightness of the emitted light 92, and thus the color temperature and brightness of the emitted light 96, may communicate information indicating both an amount of electrical charge in the power supply 12 and an amount of pre-vapor formulation held in the reservoir 34.

In another example, the control circuitry 11 may be configured to cause the light source 14 to emit light 92 having a particular color temperature and brightness based on vapor being generated by the vapor generator 40. The color temperature of the emitted light 92, in a range of color temperatures, may correspond to a particular flavorant, of a set of flavorants corresponding to separate color temperatures in the range of color temperatures, that is included in the pre-vapor formulation held in the reservoir 34. The brightness of the light 92 may be proportional to an amount of pre-vapor formulation held in the reservoir 34. Thus, the color temperature and brightness of the emitted light 92, and thus the color temperature and brightness of the emitted light 96, may communicate information indicating both a flavorant associated with the pre-vapor formulation held in the reservoir 34 and an amount of pre-vapor formulation held in the reservoir 34.

In some example embodiments, a property of the light 92 emitted by the light source 14, and thus the emitted light 96 that is emitted by a surface of the outlet-end insert 35, may be a period of elapsed time during which the light 92 is emitted by the light source 14. For example, the control circuitry 11 may be configured to cause the light source 14 to emit light 92 for a particular period of time that is proportional to the amount of electrical charge held in the power supply 12, an amount of pre-vapor formulation held in the reservoir 34, some combination thereof, or the like. As used herein, a value that is "proportional" to another value may include various types of relationships between the two values, including "inversely proportional," "directly proportional," or the like.

In some example embodiments, the control circuitry may, upon determining that vapor is to be generated based on data received from sensor 13, control a supply of electrical power to both the heating element 43 and the light source 14, simultaneously or according to a control sequence. As described above, the control circuitry 11 may control the supply of electrical power to the light source 14 to cause the light source 14 to emit light 92 having one or more particular properties that correspond to one or more monitored properties of the e-vaping device 10. The control circuitry 11 may cause the light source 14 to emit the light 92 for a particular period of time.

The control circuitry 11 may monitor the amount of elapsed time that light is emitted by the light source 14. In some example embodiments, the control circuitry 11 may control the supply of electrical power to the light source 14 to cause the light source 14 to emit a sequence of lights 92, where each separate instance of emitted light 92 has different properties, according to a control sequence. Thus, the control circuitry 11 may control the light source 14 to emit various instances of light 92 that communicate various instances of information associated with various e-vaping device properties. As referred to herein, a given "instance" of light refers to a particular continuous emission of light having a particular set of properties.

The control circuitry 11 may control the light source 14 to emit a first instance of light ("first light") having one or more particular properties that correspond to one or more property values of a first set of monitored e-vaping device properties. The control circuitry 11 may cause the light source 14 to emit the first light for a particular period of elapsed time, where the particular period of elapsed time may be associated with the first instance of light and/or may be a magnitude of elapsed time determined based on a determined value of one or more monitored e-vaping device properties in the first set of monitored e-vaping device properties.

The control circuitry 11 may subsequently control the light source 14 to emit one or more additional instances of light ("one or more additional lights") having one or more different properties that correspond to one or more additional sets of monitored e-vaping device properties. The control circuitry 11 may cause the light source 14 to emit an additional instance of light for a separate, particular period of elapsed time, where the separate, particular period of elapsed time may be associated with the additional instance of light and/or may be a magnitude of elapsed time determined based on a determined value of one or more monitored e-vaping device properties in the additional set of monitored e-vaping device properties.

Thus, the control circuitry 11 may enable the e-vaping device 10 to communicate a relatively large range of information via controlling the properties of light 92 emitted by the light source 14.

As indicated above, the control circuitry 11 may associate each instance of light 92 emitted by the light source 14 in a control sequence with a particular amount of elapsed time ("period of elapsed time"). As noted above, the magnitude of the period of elapsed time associated with a particular instance of emitted light may be controlled based on one or more monitored e-vaping device properties of the e-vaping device 10, such that even the amount of time during which a particular instance of light 92 is emitted may thus communicate information regarding the one or more monitored properties.

Upon controlling the light source 14 to emit a particular instance of light 92 (e.g., light 92 having one or more particular properties), the control circuitry 11 may enable the light source 14 to emit the particular instance of light 92 for the particular period of elapsed time that is associated with the particular instance of light 92.

In response to determining that the particular period of elapsed time associated with an emitted instance of light has elapsed, the control circuitry 11 may control the light source 14 to emit a different instance of light, having different properties (e.g., color temperature and/or brightness) corresponding to a different set of monitored e-vaping device properties of the e-vaping device 10 for a different period of elapsed time associated with the different instance of light. Upon controlling the light source 14 to emit all instances of light in the control sequence for the associated periods of elapsed time, the control circuitry 11 may cause the light source 14 to be deactivated.

In an example, based on receiving data from the sensor 13 indicating that vapor is to be generated, the control circuitry 11 may control light source 14 to emit two separate instances of light in sequence, where the first instance of emitted light 92, emitted for a first period of time that is proportional to the amount of pre-vapor formulation in the reservoir 34, has a color corresponding to a determined flavorant included in the pre-vapor formulation and has a brightness corresponding to the amount of vapor generated in response to the received data.

Continuing the example, upon the determination that the first period of time has elapsed, the control circuitry 11 may control light source 14 to switch from emitting the first instance of light 92 to emitting a second instance of light 92 for a second period of time that is fixed (e.g. a constant value that is independent of any monitored e-vaping device properties), where the second instance of light 92 has a color temperature and brightness that are both proportional with the determined amount of electrical charge in the power supply 12. In response to a determination that the second period of time has elapsed, the control circuitry 11 may deactivate the light source 14.

To control the supply of electrical power to the heating element 43 and/or the light source 14, the control circuitry 11 may execute one or more instances of computer-executable program code. The control circuitry 11 may include a processor and a memory. The memory may be a computer-readable storage medium storing computer-executable code.

The control circuitry 11 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 11 may be at least one of an application-specific integrated circuit (ASIC) and an ASIC chip.

The control circuitry 11 may be configured as a special purpose machine by executing computer-readable program code stored on a storage device. The program code may include program or computer-readable instructions, software elements, software modules, data files, data structures, and/or the like, capable of being implemented by one or more hardware devices, such as one or more instances of the control circuitry 11 mentioned above. Examples of program code include both machine code produced by a compiler and higher level program code that is executed using an interpreter.

The control circuitry 11 may include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a USB flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The control circuitry 11 may be a special purpose machine configured to execute the computer-executable code to control the supply of electrical power to the heating element 43 and/or to the light source 14. Controlling the supply of electrical power to the heating element 43 may be referred to herein interchangeably as activating the heating element 43. Controlling the supply of electrical power to the light source 14 may be referred to herein interchangeably as activating the light source 14.

As used herein, the term "flavorant" is used to describe a compound or combination of compounds that may provide flavor and/or aroma to an adult vaper. In some example embodiments, a flavorant is configured to interact with at least one adult vaper sensory receptor. A flavorant may be configured to interact with the sensory receptor via at least one of orthonasal stimulation and retronasal stimulation. A flavorant may include one or more volatile flavor substances.

The at least one flavorant may include one or more of a natural flavorant or an artificial ("synthetic") flavorant. The at least one flavorant may include one or more plant extract materials. In some example embodiments, the at least one flavorant is one or more of tobacco flavor, menthol, wintergreen, peppermint, herb flavors, fruit flavors, nut flavors, liquor flavors, and combinations thereof. In some example embodiments, the flavorant is included in a botanical material. A botanical material may include material of one or more plants. A botanical material may include one or more herbs, spices, fruits, roots, leaves, grasses, or the like. For example, a botanical material may include orange rind material and sweetgrass material. In another example, a botanical material may include tobacco material. In some example embodiments, a flavorant that is a tobacco flavor (a "tobacco flavorant") includes at least one of a synthetic material and a plant extract material. A plant extract material included in a tobacco flavorant may be an extract from one or more tobacco materials.

In some example embodiments, the first housing 30 and the second housing 30' may have a generally cylindrical cross-section. In some example embodiments, the first and second housings 30 and 30' may have a generally triangular cross-section along one or more of the first section 15 and the second section 20. Furthermore, the first and second housings 30 and 30' may have the same or different cross-section shape, or the same or different size. As discussed herein, the first and second housings 30 and 30' may also be referred to as outer housings or main housings.

In some example embodiments, the first housing 30 and second housing 30' may be a single tube housing both the first section 15 and the second section 20, and the entire e-vaping device 10 may be disposable.

Pre-vapor formulation, as described herein, is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol. The pre-vapor formulation may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire contents of each of which is incorporated herein by reference thereto.

In some example embodiments, the pre-vapor formulation is one or more of propylene glycol, glycerin and combinations thereof.

The pre-vapor formulation may include nicotine or may exclude nicotine. The pre-vapor formulation may include one or more tobacco flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

The reservoir 34, in some example embodiments, may include a storage medium that may hold the pre-vapor formulation. The storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. If and/or when the reservoir 34 includes a storage medium, the propagation of light through the reservoir 34 may be at least partially inhibited, such that external observation of pre-vapor formulation in the reservoir 34 may be at least partially inhibited and light 92 may be restricted to being emitted to an environment external to the e-vaping device 10, as emitted light 96, through a surface of the outlet-end insert 35. In some example embodiments, the reservoir 34 may include a filled tank lacking any storage medium and containing only pre-vapor formulation. If and/or when the reservoir 34 includes lacks any storage medium, the propagation of light through the reservoir 34 may be at least partially enabled, such that external observation of pre-vapor formulation in the reservoir 34 may be at least partially enabled and at least some light 92 may be emitted to an environment external to the e-vaping device, as emitted light 96, through at least a portion of the reservoir 34. For example, at least a portion of the light 92 may be directed through pre-vapor formulation held in the reservoir 34, and out into the external environment via the first housing 30, such that the pre-vapor formulation held in the reservoir 34 is illuminated to external observation.

The reservoir 34 may be sized and configured to hold enough pre-vapor formulation such that the e-vaping device 10 may be configured for vaping for at least about 1000 seconds. The e-vaping device 10 may be configured to allow each vaping to last a maximum of about 10 seconds.

The dispensing interface 41 may include a wick. The dispensing interface 41 may include filaments (or threads) having a capacity to draw the pre-vapor formulation. For example, the dispensing interface 41 may be a wick that is a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal axis of the e-vaping device 10.

The dispensing interface 41 may include any suitable material or combination of materials, also referred to herein as wicking materials. Examples of suitable materials may be, but not limited to, glass, ceramic- or graphite-based materials. The dispensing interface 41 may have any suitable capillary drawing action to accommodate pre-vapor formulations having different physical properties such as density, viscosity, surface tension and vapor pressure.

In some example embodiments, the heating element 43 may include a wire element. As shown in FIG. 1B, the heating element 43 may at least partially extend over a tip-end side of the dispensing interface 41 and may at least partially surround an aperture of the conduit 41A extending through the dispensing interface 41. The wire element may be a metal wire. In some example embodiments, the wire element may be isolated from direct contact with the dispensing interface 41.

In some example embodiments, the heating element 43 includes a stamped structure, a cut structure, an etched structure, some combination thereof, or the like. A cut structure may be a laser-cut structure, a chemical-cut structure, a mechanically-cut structure, some combination thereof, or the like. An etched structure may be a chemical-etched structure, a laser-etched structure, a mechanically-etched structure, some combination thereof, or the like.

The heating element 43 may be formed of ("may at least partially comprise") any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 43 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 43 may include at least one material selected from the group consisting of stainless steel, copper, copper alloys, nickel-chromium alloys, super alloys and combinations thereof. In some example embodiments, the heating element 43 may be formed of nickel-chromium alloys or iron-chromium alloys. In some example embodiments, the heating element 43 may be a ceramic heater having an electrically resistive layer on an outside surface thereof.

The heating element 43 may heat a pre-vapor formulation in the dispensing interface 41 by thermal conduction. Alternatively, heat from the heating element 43 may be conducted to the pre-vapor formulation by means of a heat conductive element or the heating element 43 may transfer heat to the incoming ambient air that is drawn through the e-vaping device 10 during vaping, which in turn heats the pre-vapor formulation by convection.

It should be appreciated that, instead of using the dispensing interface 41, the vapor generator 40 may include the heating element 43 such that the heating element 43 is a porous material which incorporates a resistance heater formed of a material having a high electrical resistance capable of generating heat quickly.

In some example embodiments, the e-vaping device 10 may be about 80 mm to about 110 mm long and about 7 mm to about 8 mm in diameter. For example, in some example embodiments, the e-vaping device 10 may be about 84 mm long and may have a diameter of about 7.8 mm.

Figure 1D:
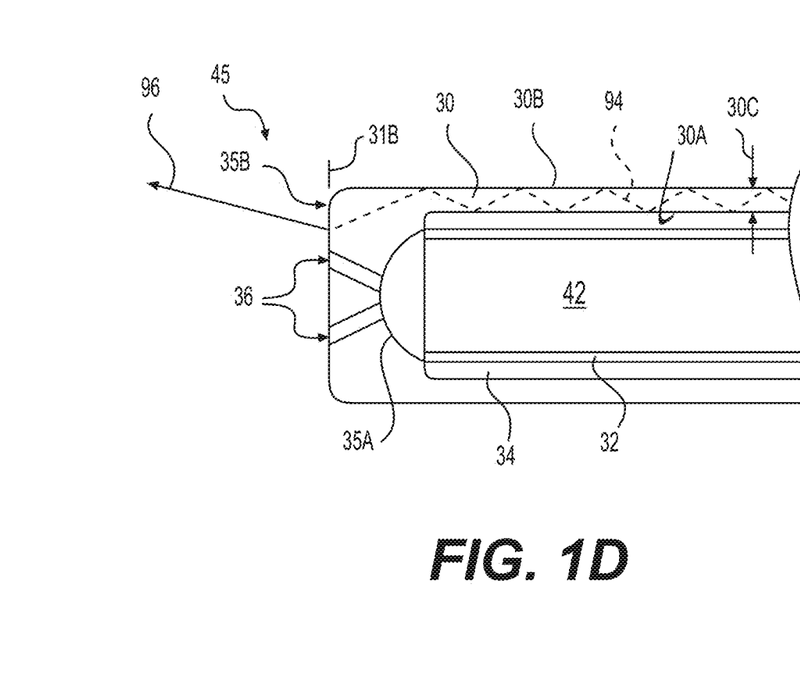
FIG. 1D is a longitudinal cross-sectional view of an outlet end of an e-vaping device, according to some example embodiments.
Figure 1E:
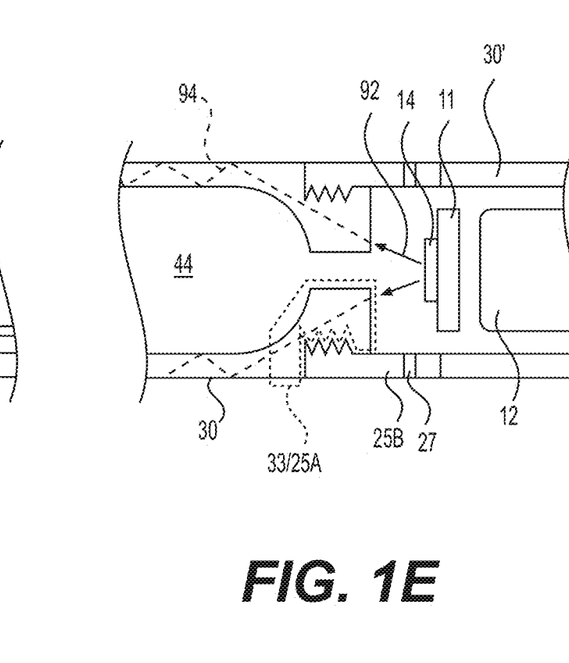
FIG. 1E is a longitudinal cross-sectional view of a portion of an e-vaping device, according to some example embodiments.

FIG. 1D is a longitudinal cross-sectional view of an outlet end of an e-vaping device, according to some example embodiments. FIG. 1E is a longitudinal cross-sectional view of a portion of an e-vaping device, according to some example embodiments.

Referring to FIG. 1D, in some example embodiments, the outlet-end insert 35 and the first housing 30 may be integral with each other and thus included in an individual integral element that is the first housing 30. Thus, as shown in FIG. 1, the first housing 30 may extend over the outlet end 45 of the first section 15 and thus may define an outlet end of the reservoir 34 and an outlet end of the channel 42. As shown in FIG. 1D, the first housing 30 may further include cavity 35A and outlet air ports 36 extending from the cavity 35A to the outlet end 31B of the first housing 30, where the outlet end 31B of the first housing 30 is also common with the outlet-end surface 35B. Thus, the outlet air ports 36 may be in fluid communication with the channel 42 through the cavity 35A, and generated vapor that is drawn through the channel 42 may further be drawn out of the e-vaping device 10 through cavity 35A and one or more outlet air ports 36 in the first housing 30.

Still referring to FIG. 1D, the first housing 30 may include a cylindrical portion extending along the longitudinal axis of the first section 15 to the outlet end 45, where the first housing 30 further includes a disc portion through which the one or more outlet air ports 36 extend. Internally-reflected light 94 that is channeled through the cylindrical portion (thickness 30C) of the first housing 30 between the inner surface 30A of the first housing 30 and the outer surface 30B of the first housing 30, as shown in FIG. 1D, may propagate through the disc portion of the first housing 30 to the outlet-end surface 35B at the outlet end 31B of the first housing 30 to be emitted from the e-vaping device 10 as emitted light 96.

By including the outlet-end insert 35 and the first housing 30 in an individual, integral element, the first section 15 may be configured to reduce the quantity of parts of the first section 15 and may further enable reduced expenditures of time, effort, costs, and/or various resources to assemble and/or maintain at least the first section 15 of the e-vaping device 10.

Referring now to FIG. 1E, in some example embodiments the tip-end portion 33 of the first housing 30 may be integral with interface 25A, such that the tip-end portion 33 of the first housing 30 is configured to both receive light 92 into the interior of the first housing 30 and is further configured to connect with interface 25B to couple the first section 15 to the second section 20.

Figure 2:
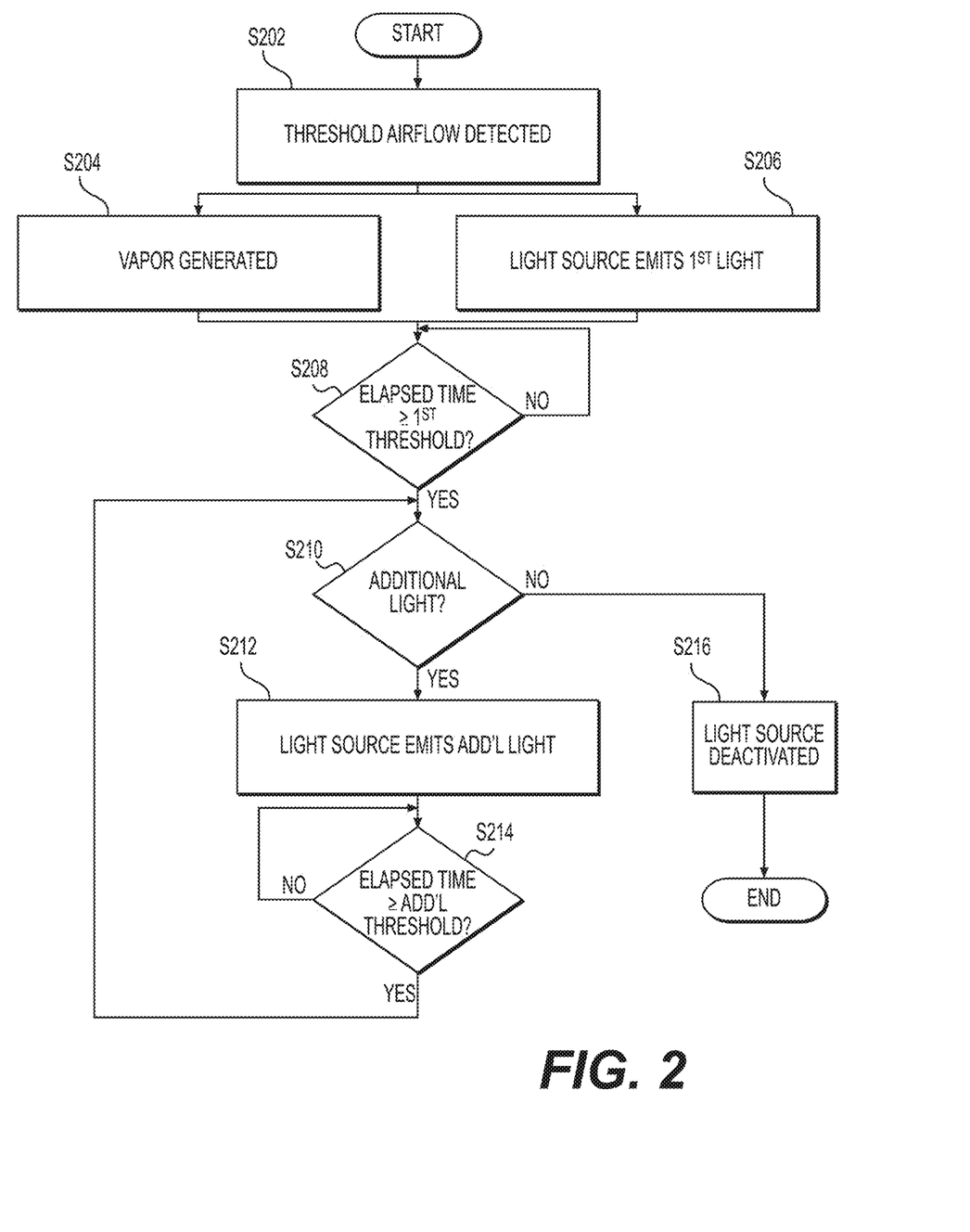
FIG. 2 is a flowchart illustrating operations that may be performed, according to some example embodiments.

FIG. 2 is a flowchart illustrating operations that may be performed, according to some example embodiments. The operations shown in FIG. 2 may be implemented at least partially by any of the example embodiments of the e-vaping device 10 included herein, including any example embodiments of the control circuitry 11.

At S202, at least a control circuitry 11 of an e-vaping device 10 may detect at least a threshold amount of air flow in the e-vaping device 10, based on sensor data generated by sensor 13. The control circuitry 11 may detect air flow based on air being drawn into the e-vaping device 10 via one or more of the air inlet ports 27 and/or air inlet ports 27A.

At S204 and S206, the control circuitry 11 may control the vapor generator 40, based on the detection at S202, to generate a vapor (S204) and may further control the light source 14 to emit a first instance of light 92 (S206). Operations S204 and S206 may be implemented simultaneously or substantially simultaneously (e.g., in parallel). Operations S204 and S206 may be implemented in series according to a sequence of operations.

Controlling the vapor generator 40 at operation S204 may include controlling a supply of electrical power from the power supply 12 to the heating element 43 to cause the heating element 43 to generate heat to vaporize at least a portion of the pre-vapor formulation held in the dispensing interface 41. The supply of electrical power may be controlled to cause a particular amount of electrical power to be supplied to the heating element 43 for a particular period of time, thereby causing a particular amount of vapor to be generated.

Controlling the light source 14 at operation S206 may include causing the light source to emit light 92 having one or more particular properties for a particular period of elapsed time. For example, the light source 14 may be controlled to emit light having a particular brightness and/or color temperature for a particular period of elapsed time. The period of elapsed time may extend from a point in time at which a detected drawing of air through at least a portion of the e-vaping device ceases or drops below a threshold flow value (referred to herein as a cessation of air being drawn through at least the portion of the e-vaping device). The one or more particular properties of the first instance of light may be selected based on one or more values of a set of one or more monitored e-vaping device properties of the e-vaping device 10. Such one or more e-vaping properties may include a determined amount of pre-vapor formulation held in the reservoir 34, a determined amount of electrical charge held in the power supply section, and/or a magnitude of generated vapor that is generated by the vapor generator 40 at operation S204.

As noted above, controlling the light source 14 at operation S206 may include causing the light source to emit the first light for a first period of elapsed time. The first period of elapsed time may be a period of elapsed time extending from the time at which the light source 14 first emits the first light at operation 206 to a first threshold value of elapsed time.

At S208, based on a determination that the light source 14 has emitted the first light for at least the first period of elapsed time (e.g., a period of elapsed time extending from the time at which the light source 14 first emits the first light at operation 206 to at least the first threshold value of elapsed time), the control circuitry 11 may make a determination regarding whether an additional instance of light (e.g., light having one or more properties different from the first instance of light) is to be emitted by the light source 14. If not, at S216, then the control circuitry 11 may deactivate the light source 14.

If, at S212, a determination is made at S210 that at least one additional instance of light having one or more properties associated with an additional set of monitored e-vaping device properties is to be emitted by the light source 14, the control circuitry 11 may control the light source 14 to emit an additional instance of light 92, having one or more properties different from the first instance of light 92 and corresponding to the additional set of monitored e-vaping device properties, for an additional period of elapsed time. At S214, upon a determination that the additional period of elapsed time has elapsed, the control circuitry 11 may either control the light source 14 to emit a further additional instance of light at S210 and S212 or may deactivate the light source 14 at S216.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A cartridge for an e-vaping device, the cartridge comprising:
   a housing extending along a longitudinal axis of the cartridge, the housing configured to at least partially enclose a reservoir and a vapor generator configured to draw pre-vapor formulation from the reservoir and to heat the drawn pre-vapor formulation to form a generated vapor, the housing having a tip end and an outlet end, the housing configured to
      receive light at the tip end of the housing such that the light is received into a thickness of the housing, and
      channel the light from the tip end of the housing to the outlet end of the housing via internal reflection through the thickness of the housing between an inner surface of the housing and an outer surface of the housing; and
   an outlet-end insert coupled to the outlet end of the housing, the outlet-end insert including at least one outlet air port configured to be in flow communication with the vapor generator enclosed by the housing, the outlet-end insert configured to direct the generated vapor out of the cartridge through the at least one outlet air port, the outlet-end insert further configured to emit the channeled light.

2. The cartridge of claim 1, wherein,
   the outlet-end insert is configured to channel the channeled light substantially exclusively through an outlet-end surface of the outlet-end insert, the outlet-end surface extending substantially orthogonally to the longitudinal axis of the cartridge.

3. The cartridge of claim 1, wherein,
   the housing and the outlet-end insert are integral with each other as an individual integral element.

4. The cartridge of claim 1, wherein,
   at least the housing is transparent to visible light in a direction that is substantially orthogonal to the longitudinal axis of the cartridge.

5. The cartridge of claim 1, further comprising:
   a cartridge connector interface that is coupled to the housing at a tip end portion of the housing.

6. The cartridge of claim 5, wherein the cartridge connector interface and the housing are integral with each other as an individual integral element.

7. An e-vaping device, comprising:
   the cartridge of claim 5; and
   a power supply section coupled to the cartridge via a power supply connector interface that is connected to the cartridge connector interface of the cartridge, the power supply section configured to supply electrical power to the cartridge to cause the vapor generator enclosed by the housing of the cartridge to form the generated vapor.

8. The e-vaping device of claim 7, further comprising:
   a light source included in one of the cartridge and the power supply section, the light source configured to emit light based on electrical power received from the power supply section, the housing configured to receive at least a portion of the light emitted by the light source at the tip end of the housing.

9. The e-vaping device of claim 8, wherein
   the power supply section includes control circuitry configured to activate the light source based on a determination that air is being drawn through at least a portion of the e-vaping device, the control circuitry further configured to cause the light source to remain activated for at least a particular period of elapsed time following a cessation of air being drawn through at least the portion of the e-vaping device.

10. The e-vaping device of claim 9, wherein,
    the light source is configured to emit light having a particular property, the particular property being a color of the light and/or a brightness of the light; and
    the control circuitry is further configured to control the particular property of the light emitted by the light source, based on,
       a determination that the light source has emitted light for at least a threshold period of elapsed time,
       a determined amount of pre-vapor formulation held in the reservoir,
       a determined amount of electrical charge held in the power supply section, and/or
       a magnitude of generated vapor that is generated by the vapor generator.

11. The e-vaping device of claim 7, wherein,
    the power supply section includes a housing that is separate from the housing of the cartridge and is opaque to visible light.

12. The e-vaping device of claim 7, wherein the power supply section and the cartridge are configured to be removably coupled together.

13. The e-vaping device of claim 7, wherein the power supply section includes a rechargeable battery.

* * * * *